United States Patent [19]

Daussan et al.

[11] Patent Number: 5,603,373
[45] Date of Patent: Feb. 18, 1997

[54] PROCESS FOR TREATING MOLTEN METAL DURING A CASTING OPERATION USING A FILTER AND FILTER FOR IMPLEMENTING THE PROCESS

[75] Inventors: Jean-Charles Daussan, Metz; Gérard Daussan; André Daussan, both of Longeville-Les-Metz, all of France

[73] Assignee: Daussan et Compagnie, Woippy, France

[21] Appl. No.: 428,843

[22] Filed: Apr. 25, 1995

Related U.S. Application Data

[63] Continuation of Ser. No. 69,837, Jun. 1, 1993, abandoned.

[30] Foreign Application Priority Data

| May 29, 1992 | [LU] | Luxembourg | 88124 |
| Oct. 30, 1992 | [FR] | France | 92 13039 |
| Jan. 6, 1993 | [FR] | France | 93 00062 |

[51] Int. Cl.⁶ .................................... B22D 27/20
[52] U.S. Cl. .......................... 164/358; 164/58.1
[58] Field of Search ................... 164/55.1, 56.1, 164/57.1, 58.1, 59.1, 134, 358

[56] References Cited

U.S. PATENT DOCUMENTS

| 3,658,115 | 4/1972 | Ryntz, Jr. et al. | 164/57.1 |
| 3,815,661 | 6/1974 | Curran et al. | 164/134 |
| 3,881,937 | 5/1975 | Teufel | 164/57.1 |
| 3,961,663 | 6/1976 | Degois et al. | 164/58.1 |
| 4,330,327 | 5/1982 | Pryor | 164/358 |
| 4,955,427 | 9/1990 | Hitchings | 164/358 |

FOREIGN PATENT DOCUMENTS

| 0234979 | 9/1987 | European Pat. Off. . | |
| 0249897 | 12/1987 | European Pat. Off. | 164/358 |
| 0410603 | 1/1991 | European Pat. Off. . | |
| 2593077 | 7/1987 | France . | |
| 1608051 | 10/1970 | Germany . | |
| 2608282 | 9/1977 | Germany | 164/55.1 |
| 6908444 | 12/1970 | Netherlands | 164/55.1 |

*Primary Examiner*—Kuang Y. Lin
*Attorney, Agent, or Firm*—Young & Thompson

[57] ABSTRACT

A filter for molten metal comprises a series of at least two refractory mineral material plates which define between them one or more cavities. The plates each comprise a series of holes through which the liquid metal passes and by which the liquid metal is filtered. At least one of the cavities contains a material for treating the metal, for example a material for inoculating the liquid metal. The filter is used among other things to filter and treat molten metals simultaneously and to improve the quality of the metal.

13 Claims, 6 Drawing Sheets

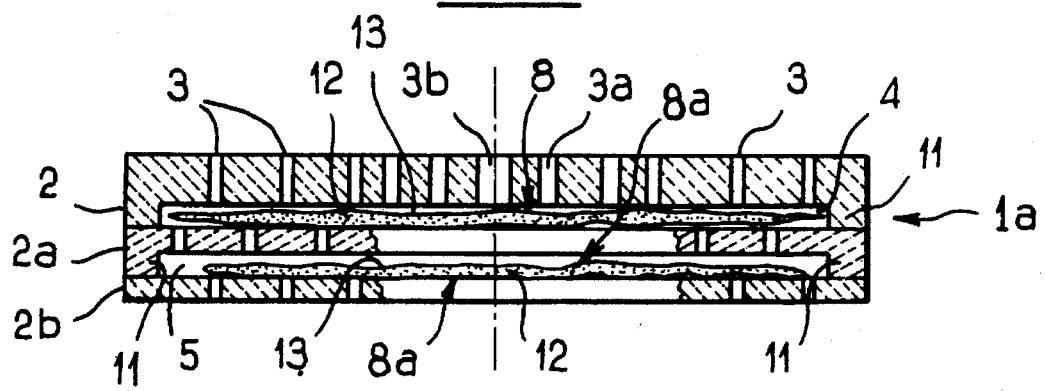
FIG_1
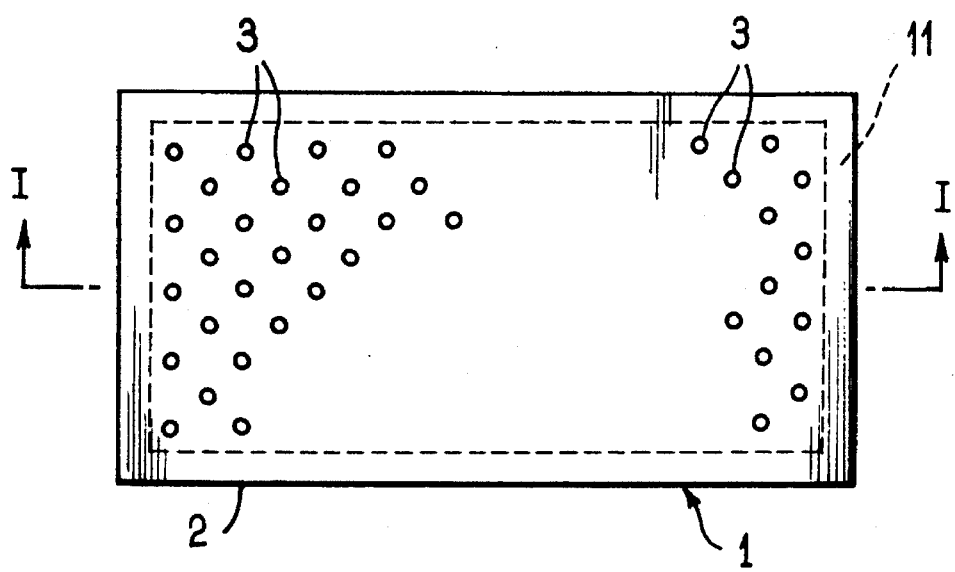
FIG_2
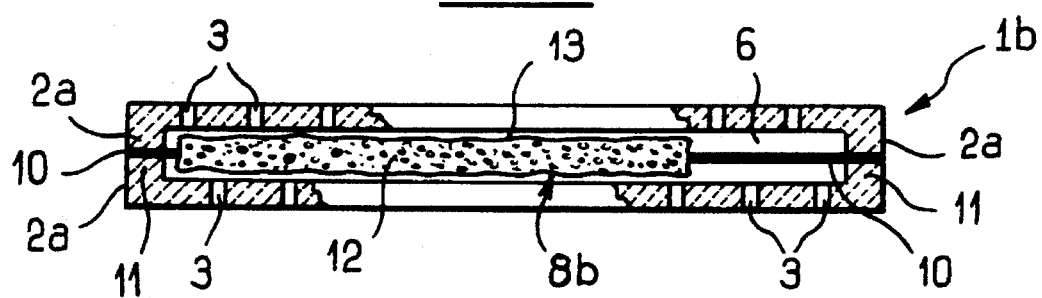
FIG_3

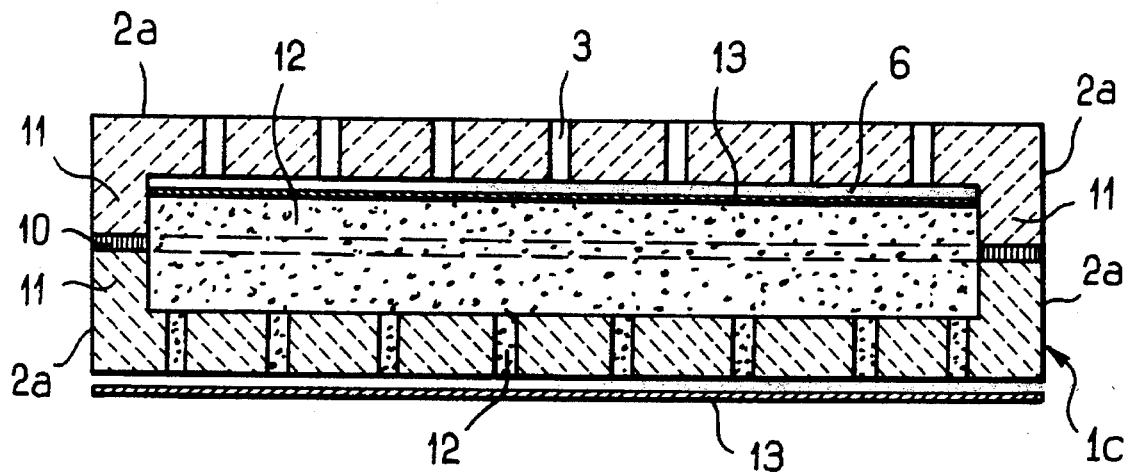
FIG_4
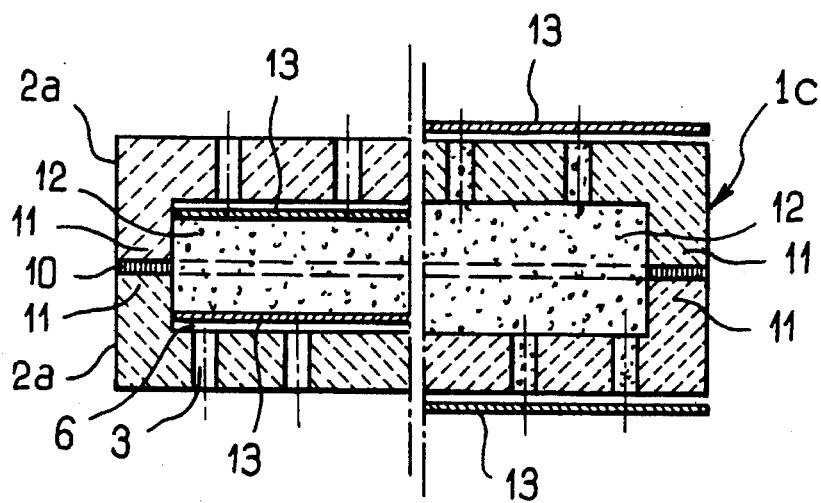
FIG_5

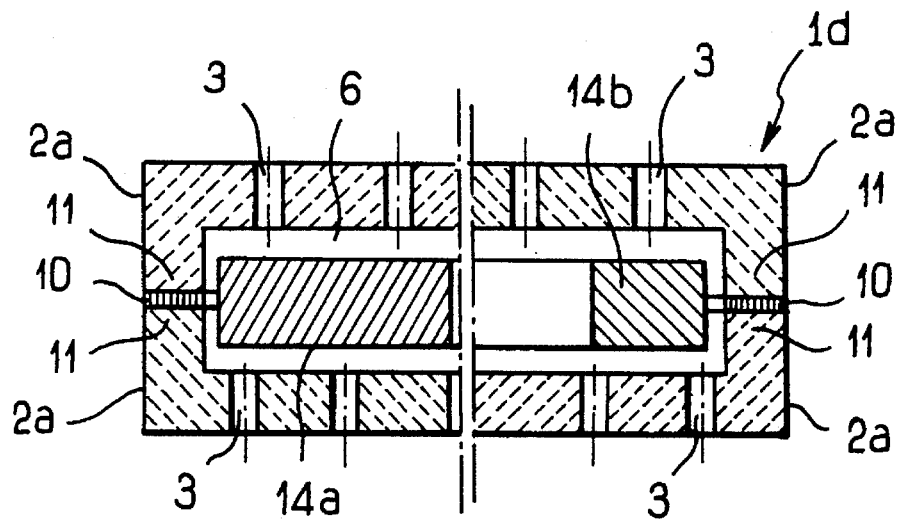
FIG_6
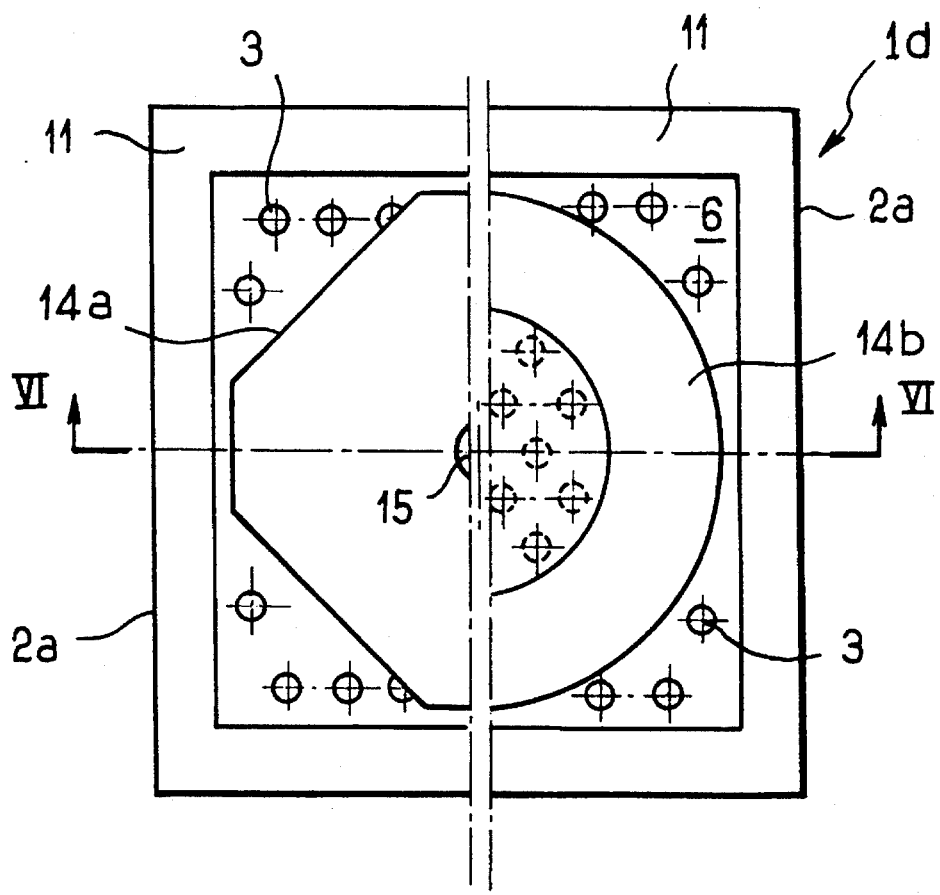
FIG_7

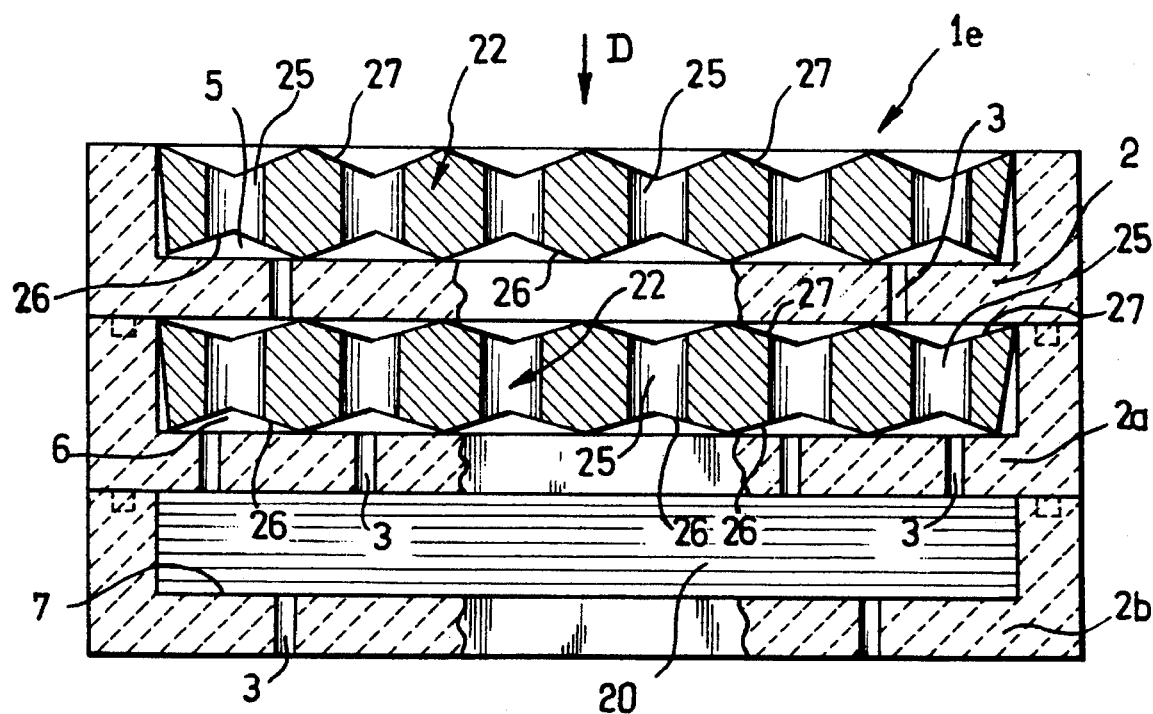
FIG_8
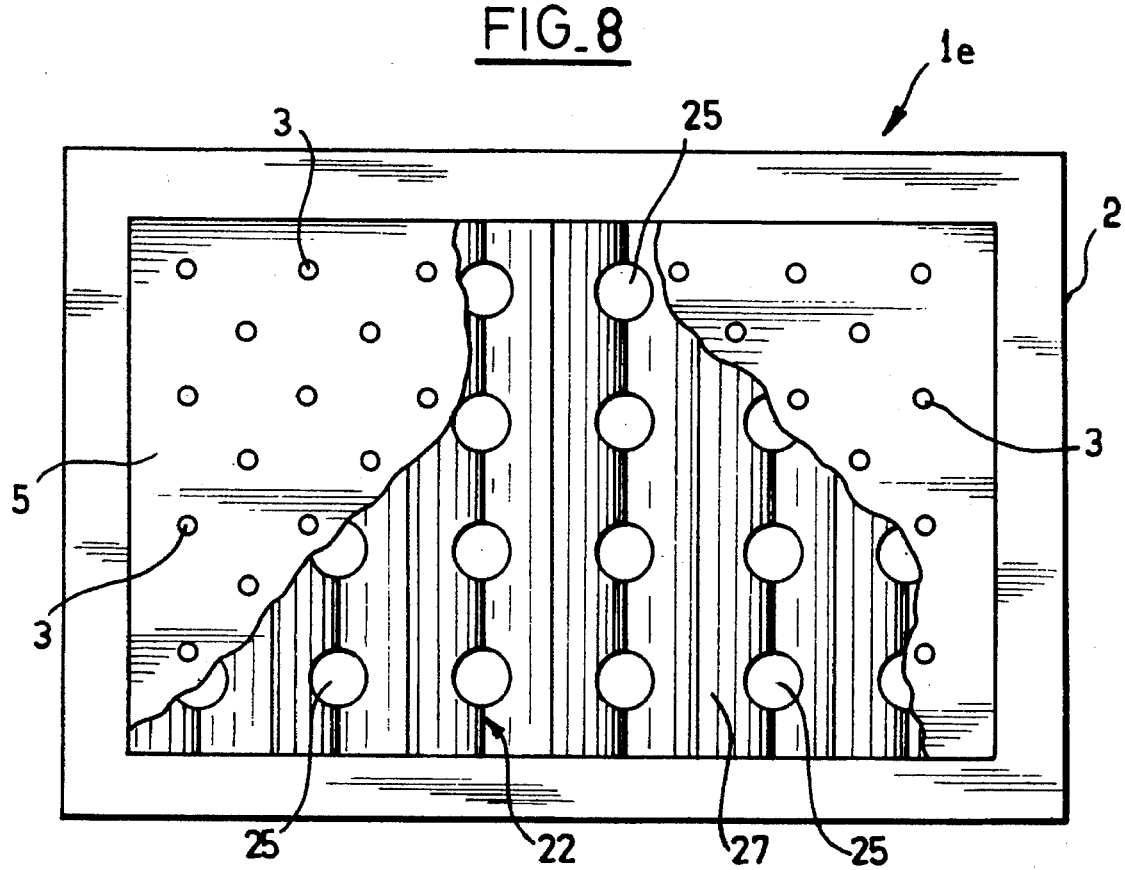
FIG_9

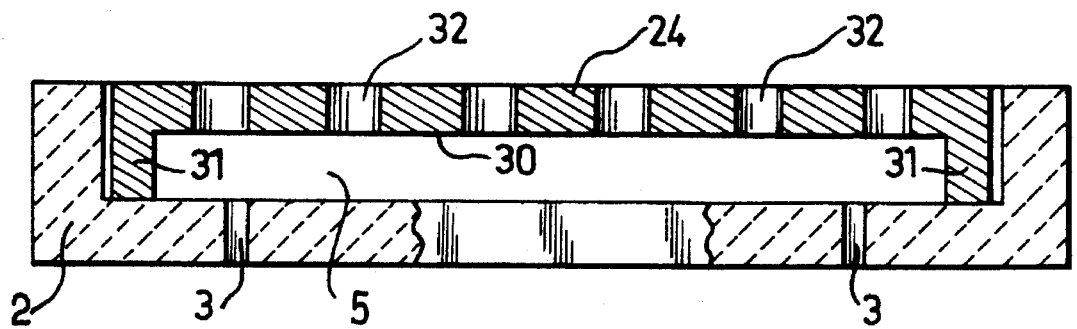
FIG_12
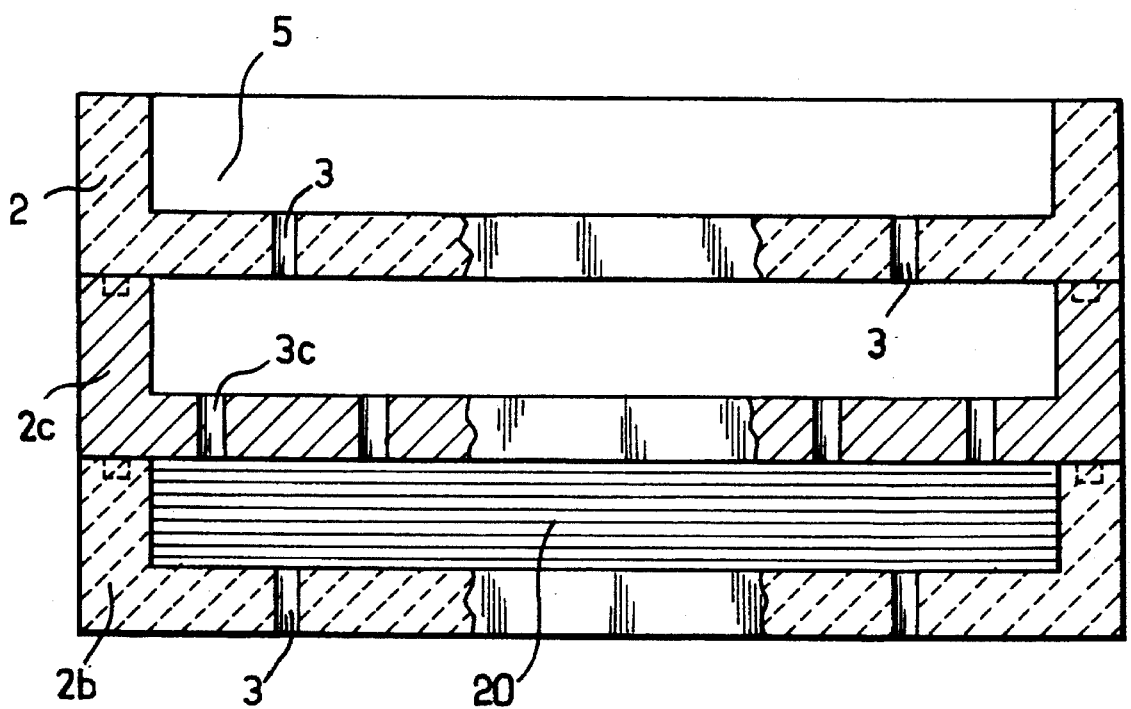
FIG_13

5,603,373

PROCESS FOR TREATING MOLTEN METAL DURING A CASTING OPERATION USING A FILTER AND FILTER FOR IMPLEMENTING THE PROCESS

This application is a continuation of application Ser. No. 08/069,837, filed Jun. 1, 1993, now abandoned.

BACKGROUND OF THE INVENTION

1. Field of the Invention

The present invention concerns a process for treating a molten metal during a casting operation into a mold using a filter, the process including the step, prior to casting the molten metal, of placing a material for treating said metal at a point on the channel adapted to guide said metal to the filter.

The invention also concerns a filter for implementing the process in accordance with the invention.

2. Description of the Prior Art

The treatment agents are usually merely placed in the channels for the molten metal, which is time-consuming.

It is also known to distribute products for treating the metal by placing the treatment products in destructible sachets which are disposed in a corner or a cul-de-sac of the channels for the metal upstream of the filter; this process has the drawback that it does not guarantee that all of the metal comes into contact with the treatment agents.

Because of turbulence caused by the flow of the metal in the casting channels the destructible sachets are sometimes dislodged from where they are placed and travel upstream into the funnel into which the molten metal is poured. This results in wastage of the unused treatment material and rejection of the cast parts because the metal is insufficiently treated. Also the molten metal does not enter fully into contact with the treatment material and the metal cast in the mold may not be homogeneous.

It is also known to treat the liquid metal by placing on the upstream side of the filter pastilles of treatment products held together by a binder or by pressing and/or sintering and/or molding them: once again, there is no guarantee that all of the metal has been treated. Also, this represents a further handling operation.

An object of the present invention is to remedy the drawbacks of the prior art processes and to propose a process of the aforementioned type whereby all of the cast molten metal is treated as regularly and as homogeneously as possible and the treatment material is entirely used to treat said metal.

Another object of the invention is to propose a filter for implementing said process.

SUMMARY OF THE INVENTION

In a first aspect, the invention consists in a process for treating a molten metal during an operation to cast it into a mold using a filter, said process including the step, prior to casting the molten metal, of placing a material for treating said metal at a point of the channel adapted to guide said metal to the filter, in which process a molten metal filter is used comprising a series of at least two refractory mineral material plates in contact with each other at their periphery and defining one or more cavities between them, said plates each comprise a series of holes through which the molten metal passes and by which the molten metal is filtered and the treatment material is introduced into at least one of said cavities before said filter is placed in said mold.

In this way it is certain that the treatment material will not be expelled from the cavity by turbulence caused by the flow of the molten metal, as it is retained between two plates, and that it will all be used to treat the metal. This eliminates any risk of rejection of the cast parts because of defective treatment of the metal.

Furthermore, all of the molten metal passing through the filter is brought into contact with the treatment material and this contact takes place within the cavity of the filter where the metal travels at a lower speed than in the channels.

It has been found that metal cast by the process of the invention has a better distribution of the treatment product and improved treatment homogeneity as compared with the prior art processes.

Without wishing to claim that this is the only possible explanation of this unexpected and surprising result, it is thought that the result is due to the very slow speed at which the metal travels in the filter cavity compared to the much higher speeds at which it passes through the holes in the plates. This causes energetic and very regular mixing of the untreated metal reaching the interior of the cavity at high speed and the already treated metal remaining in this cavity before it is evacuated through the holes in the second plate, this mixing continuing throughout the duration of casting.

Combined with the fact that the treatment product is trapped within the cavity and cannot be expelled from it under any circumstances, this mixing probably explains the very regular distribution of the treatment product in the metal of the cast part and the excellent homogeneity of the result of treating said metal within said part.

In a second aspect, the invention consists in a filter for molten metal adapted to implement the process of the invention in its first aspect and comprising a series of at least two refractory mineral material plates in contact with each other at their periphery and defining between them one or more cavities, wherein said plates each comprise a series of holes through which said molten metal passes and by which said molten metal is filtered and at least one of said cavities contains a material for treating said metal.

This enables the preparation of prefabricated filters containing a predetermined dose of the treatment product: filters of this kind are highly suited to mass production, facilitate the work of the casting shop and reduce the problems associated with management of consumable materials and products for such shops.

In one beneficial embodiment of the invention the filter comprises at least two plates joined together along their periphery, the cavity formed between said two plates is filled with said powdered treatment material and said holes in said plates are blocked by a film of a material adapted to melt, carbonize or calcine in contact with the molten metal to be treated, said film being disposed on the inside or the outside surface of each plate.

In this way the treatment material can be easily sealed by an insulated film of this kind against moisture in the atmosphere so that it remains perfectly dry, enabling problem-free storage of prefabricated filters.

The filters are used to eliminate from the liquid metal any solid inclusions such as metal oxides likely to affect the quality of the metal which is cast into a container such as a mold or a mold for ingot.

The effectiveness of any such filter depends essentially on the diameter of the holes and the number of plates constituting it. The smaller the diameter of the holes the greater the ability of the filter to hold back fine inclusions and the more effective the filter action.

If the holes have a diameter less than 1 mm filtration takes a very long time (because the liquid metal passes through holes this size with great difficulty) and the holes rapidly clog.

If the number of plates is increased the cost of the filter is increased.

In one advantageous embodiment of the invention said treatment material is an inoculating material in plate form optionally comprising one or more holes for said liquid metal to pass through.

This inoculating material improves the characteristics of the metal.

Thus the inoculating material makes it possible to increase very significantly the effectiveness of the filter by virtue of a barrage effect. Also, the cavities in the filter plates form receptacles which are particularly well suited to receiving the inoculating material with the result that use of this material does not require any modification of the filter.

When the liquid metal enters the filter it laps the surface of this plate which treats the metal with the aim of improving it.

In one advantageous embodiment of the invention at least the side of said plate adjacent the bottom of the cavity comprises a series of recesses.

These recesses increase the area of contact between the liquid metal and the inoculating material which increases the effectiveness of the inoculation reaction.

In one embodiment of the filter in accordance with the invention said inoculating material is in the form of spaced bars extending across substantially all of the length and the width of a cavity.

Such bars are simple to manufacture and also make it possible to obtain a large area of contact between the inoculating material and the liquid metal without impeding the passage of the latter through the filter.

In another embodiment of the invention at least one of the cavities is filled with a filter material.

This filter material comprises refractory fibers, for example, and further increases the effectiveness of filtration.

The inoculating material is preferably selected from the following substances: alloys of iron, magnesium and magnesium compounds, calcium and its compounds, lithium compounds, strontium and barium compounds, silicon, zirconium, aluminum, rare earth, graphite and carbon.

Other features and advantages of the invention will emerge from the following description given by way of non-limiting example and with reference to the appended drawings.

BRIEF DESCRIPTION OF THE DRAWINGS

FIG. 1 is a view in cross-section on the line I—I in FIG. 2 of a two-stage filter in a first embodiment of the present invention.

FIG. 2 is a plan view of the filter from FIG. 1.

FIG. 3 is a view similar to FIG. 1 of a filter comprising only one cavity.

FIG. 4 is a view to a larger scale and in cross-section of a filter in a second embodiment of the present invention.

FIG. 5 is a view similar to FIG. 4 comprising two adjoining half-views of respective variants of the filter shown in said figure.

FIG. 6 is a view in cross-section on the line VI—VI in FIG. 7.

FIG. 7 is a plan view with the top plate removed comprising two adjoining half-views of respective variants of a third embodiment of the present invention.

FIG. 8 is a view in cross-section of a fourth embodiment of the filter in accordance with the invention.

FIG. 9 is a partially cut away plan view of the filter from FIG. 8.

FIG. 12 is a partial view in cross-section of a sixth embodiment.

FIG. 13 is a view in cross-section of a seventh embodiment.

DETAILED DESCRIPTION OF THE INVENTION

Figure 10:
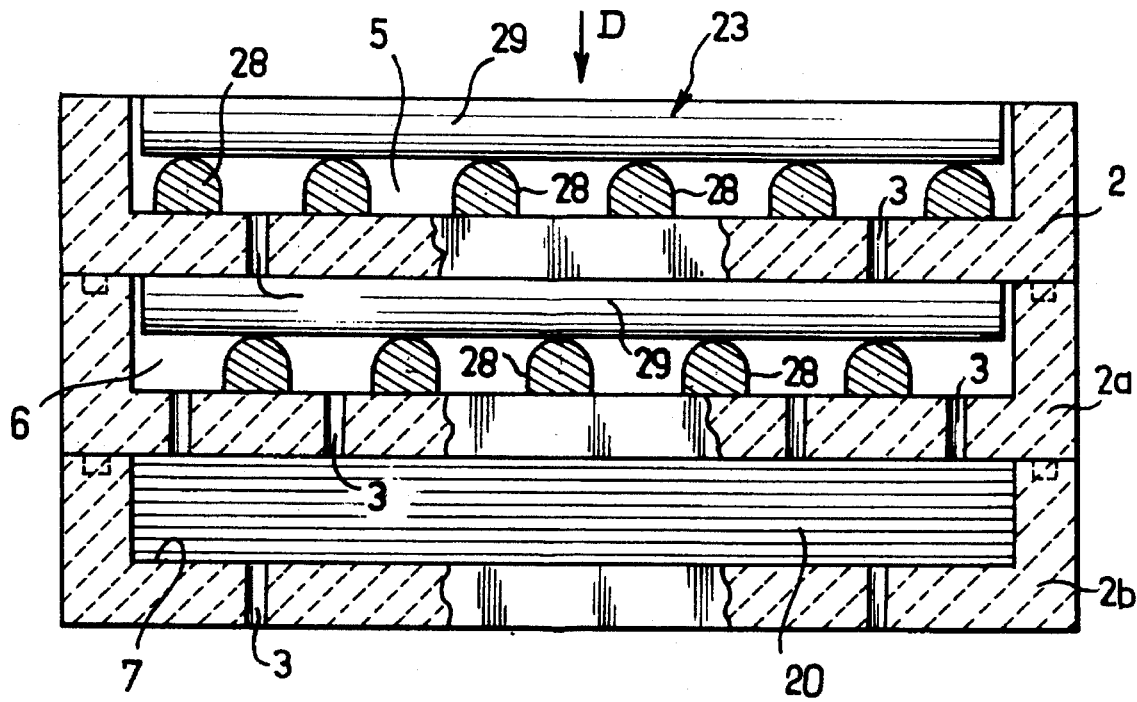
FIG. 10 is a view in cross-section of a fifth embodiment of the filter.

As shown in the figures, the process with which the invention is concerned for treating molten metal during an operation of casting it in a mold using a filter 1, 1a, 1b, 1c, 1d, 1e comprises the step, prior to casting the molten metal, of placing a material 12, 22, 23, 24 for treating said metal at a point on the channel adapted to guide said metal to said filter.

In the process of the invention a filter 1, 1a, 1b, 1c, 1d, 1e for liquid metal is used which comprises a series of at least two refractory mineral material plates 2, 2a, 2b in contact with each other at their periphery and defining between them one or more cavities 4, 5, 6, each plate 2, 2a, 2b comprising a series of holes 3, 3a, 3b through which the liquid metal passes and by which it is filtered, and the treatment material 12, 22, 23, 24 is introduced into at least one of the cavities 4, 5, 6 before the filter 1, 1a, 1b, 1c, 1d, 1e is placed in a mold (not shown) such as a cylindrical sleeve.

The treatment material 12, 22, 23, 24 is selected from desulphurizing, thermogenic inoculating, spheroidizing, recarburizing, refining and modifying products and additive alloys.

The weight of the treatment material 12, 22, 23, 24 may vary between approximately 0.001% and 1% of the weight of the liquid metal depending on the nature of the treatment to be applied.

The filter 1a shown in FIG. 1 comprises three plates 2, 2a, 2b. The plates 2 and 2a each have a projecting peripheral rim 11 adapted to come into contact with the respective adjacent plate 2a, 2b which is thus spaced from it to form a respective cavity 4, 5. The plate 2b has no such rim, as this would increase the height of the filter 1 with no benefit.

The upper plate, which is normally on the upstream side, has progressively increasing diameter holes 3, 3a, 3b in it. The plates 2a, 2b also have holes in them, of the same diameter or different diameters. The holes in the intermediate plate 2a are arranged in a quincunx arrangement relative to the holes in the outer plates 2 and 2b. The holes 3, 3a, 3b may be non-circular.

In the known way the plates 2, 2a, 2b are made from a ceramic refractory mineral material such as silica, for example, and are able to withstand the temperature of the cast metal without distortion.

The filter 1 shown in FIG. 2 comprises a plate 2 with holes 3 of substantially the same diameter.

The filter 1b shown in FIG. 3 comprises two plates 2a whose peripheral edges 11 are adjacent and fastened together by an adhesive 10. The heights of the rims 11 are shown the same but they could be different. The two plates delimit a cavity 6.

FIGS. 4 and 5 on the one hand and FIGS. 6 and 7 on the other hand respectively show a filter 1c, 1d comprising two plates 2a in contact at their peripheral edge 11 to delimit a cavity 6.

In the embodiment shown in FIGS. 8 through 12 the liquid metal filter comprises three refractory material plates 2, 2a, 2b in contact with each other at their periphery and defining between them a plurality of cavities 5, 6, 7. The plates 2, 2a, 2b each comprise a series of holes 3 through which the liquid metal passes and by which it is filtered as it passes through the filter in the direction of the arrow D.

As shown in FIGS. 1 through 12, and in accordance with the invention, at least one of the cavities 4, 5, 6 of the filter 1, 1a, 1b, 1c, 1d, 1e contains a material for treating the molten metal.

In the embodiment of FIGS. 1, 3, 4 and 5 the treatment material 12 is in powder form and is retained by a film 13 of a material adapted to melt, carbonize or calcine in contact with the liquid metal to be treated.

The particle size of the powder material is selected in accordance with the required treatment conditions.

The film 13 of a material adapted to melt, carbonize or calcine in contact with the metal to be treated is an aluminum or paper or plastics material or composite film, for example.

In the embodiment of FIGS. 1 and 3 the treatment material 12 is contained in sachets 8, 8a, 8b made from said film 13 and placed in said cavity 4, 5, 6.

The cavities 4 and 5 in FIG. 1 each contain a respective sachet 8, 8a which fills the respective cavity 4, 5 partially or almost completely. The sachets 8, 8a may be identical or have different capacities.

The cavity 6 in FIG. 3 contains a sachet 8b disposed eccentrically in said cavity 6, for example.

In the embodiment of FIGS. 4 and 5 the cavity 6 formed between the two plates 2a is filled with powdered treatment material 12 and the holes 3 in the plates 2a are blocked by a film 13 of the aforementioned type disposed on the inside or outside surface of each plate 2a.

In the FIG. 4 example a film 13 is fixed (for example glued) to the inside surface of the upper plate. Another film 13 is fixed to the outside surface of the lower plate, the holes 3 being filled with treatment material 12.

In the FIG. 5 example the films 13 are fixed to the inside surfaces of the plates in the lefthand half-view and to the outside surfaces of the plates in the righthand half-view. This latter case represents the maximum volume of treatment material 12 that can be contained in the filter 1c.

In the embodiment of FIGS. 6 and 7 the powdered treatment material 12 is pressed or sintered to form plates 14a, 14b or bars. The dimensions of the plates 14a, 14b or bars are less than or equal to the inside dimensions of the cavity 6 so that as soon as casting begins the plates or bars can move inside the cavity 6 due to the turbulence caused by the arrival of the molten metal in the cavity 6.

The lefthand half-view shows, by way of example, a hexagonal contour plate 14a whereas the righthand half-view shows an annular plate 14b. Plates 14a, 14b of this kind are pressed with a binder such as stearate or the like, for example; the treatment material 12 prepared in crystallized form, for example, can also be bound together under high pressure. The plate 14a includes a central hole 15 through which the metal passes. It could comprise other holes of various shapes and sizes.

The treatment materials may be desulphurizing agents, for example magnesium and/or calcium carbide, and/or thermogenic agents, for example calcium carbide, and/or inoculation and/or post-inoculation agents and/or spheroidizing agents, for example magnesium and/or rare earths and/or ferrosilicomagnesium, and/or additive alloy agents, for example molybdenum, boron, silicon, ferrosilicon, manganese, chromium, titanium, ferroaluminium, silicomishmetal alloys, recarburizing agents, for example based on carbon or graphite, or fluxes for modifying the structure of the metal, such as sodium, phosphorous, boron, titanium, strontium, etc. salts.

FIGS. 8 through 13 show other embodiments of the invention in which the treatment material is a material 22, 23, 24 for inoculating the liquid metal. In the example shown in FIG. 8 the cavities 5, 6 each contain an inoculating material 22.

In the case of FIGS. 8 and 9 the inoculating material 22 is in the form of a plate comprising holes 25 through which the liquid metal passes and extending over substantially all of the length and the width of the cavity 5 or 6.

The side of each plate 22 adjacent the bottom of the cavity 5 or 6 further comprises a series of recesses 26 made up of a series of parallel dihedra.

In the FIG. 8 example the other side of the plate 22 also comprises recesses 27. FIGS. 8 and 9 also show that the holes 25 in the inoculating material plate 22 have a larger cross-section than the holes 3 in the refractory material plates 2, 2a, 2b.

When the liquid metal (steel or cast iron) passes through the filter 1e shown in FIG. 8 it first comes into contact with the upper surface of the inoculating material plate 22, passes through the holes 25 in this and then fills the recesses 26 on the lower surface of the plate 22, thereafter flowing through the filter holes 3 in the plate 2.

Because the holes 3 are smaller than the holes 25 in the inoculating material plates 22 the metal fills the recesses 26 which achieves a large area of contact between the liquid metal and the inoculating material which is beneficial to the metal treatment reaction.

In this way the presence of the inoculating material 22 in the filter in combination with the filter holes 3 makes it possible to improve the metal more effectively than by means of a simple filtration operation.

Figure 11:
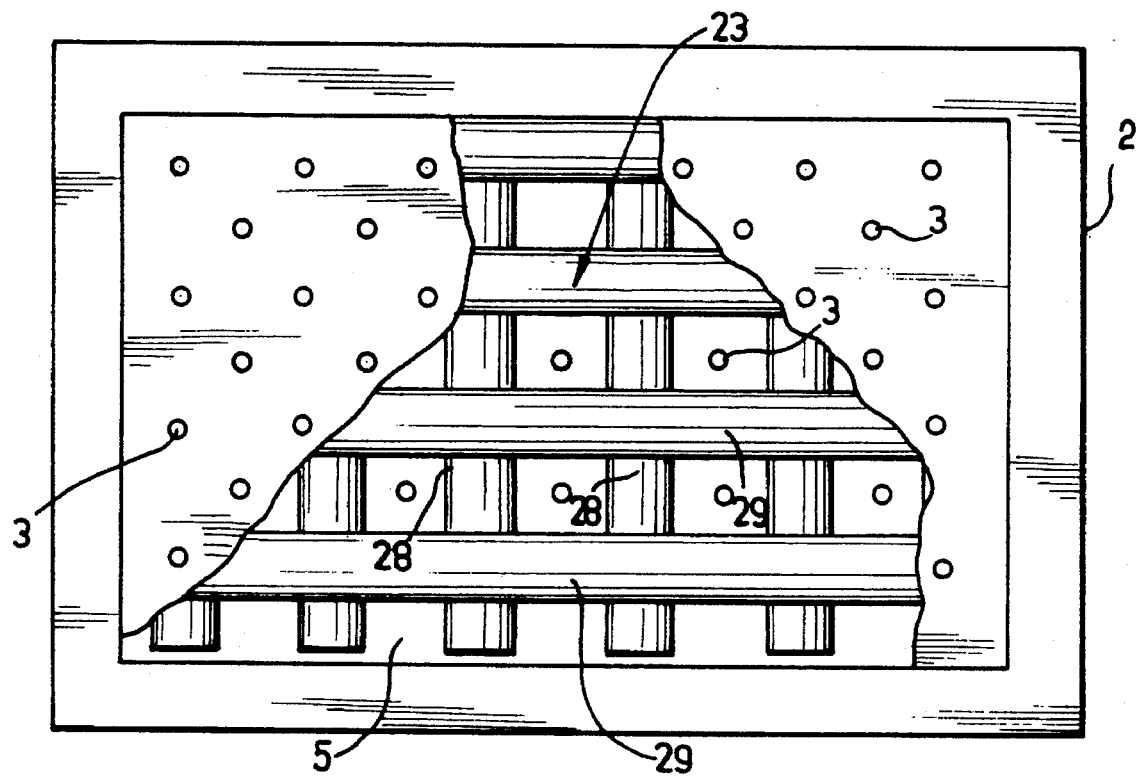
FIG. 11 is a plan view of the filter from FIG. 10.

In the embodiment of FIGS. 10 and 11 the inoculating material 23 is in the form of spaced bars 28, 29 extending over substantially all the length and the width of the cavities 5 and 6 in the refractory plates 2, 2a.

In this embodiment the bars 28, 29 are disposed in two superposed and crossed layers, as shown in FIG. 11 in particular.

During filtration the liquid metal laps over the surface of the bars 28, 29 and then accumulates at the bottom of the cavities 5, 6 before flowing downwardly through the holes 3.

This embodiment also achieves a large area of contact between the liquid metal and the inoculating material enabling the yield from the inoculant to be improved.

In the FIG. 12 embodiment the side of the inoculating material plate 24 adjacent the bottom of the cavity 5 of the refractory plate 2 has a recess 30 delimited by a peripheral lip 31 which rests on the bottom of the cavity 5. This plate 24 has holes 32 in it through which the liquid metal passes.

As in the embodiments of FIGS. 8 through 11 the holes 32 in the inoculating material plate 24 are larger than the holes 3 in the plate 2. Because of this the liquid metal which is poured onto the plate 24 passes through the holes 32 and then fills the recess 30 before flowing through the holes 3 in the plate 2.

By filling the recess 30 the liquid metal is in contact with a large proportion of the surface of the inoculating material 24 so that the inoculation action is more effective.

In the FIG. 13 example the inoculating material is in the form of a plate 2c with holes 3c the same shape as those of the refractory material plates 2, 2b and is substituted for one of the latter.

Also, as shown in FIGS. 8, 10 and 13 at least one of the cavities of the refractory material plates 2, 2a, 2b is filled with a filter material 20, for example with refractory fibers.

The filter material 20 is preferably disposed in a cavity 7 on the side of a cavity 5 or 6 containing an inoculating material 22 or 23 which is the downstream side relative to the direction D in which the liquid metal passes through the cavity (see FIGS. 8 and 10).

The filter material 20 is effective in its own right and further enhances the performance of the filter in accordance with the invention.

To give a non-limiting example, the inoculating material is selected from the following substances: iron alloys (Fe-Si alloy, for example), magnesium and magnesium compounds, calcium and calcium compounds, lithium compounds, strontium and barium compounds, silicon, zirconium, aluminum, rare earths, graphite and carbon.

Of course, the invention is not limited to the embodiments that have just been described and numerous modifications may be made thereto without departing from the scope of the invention. The pressed or sintered plates 14a, 14b may be replaced with solid molded plates.

There is claimed:

1. Apparatus for filtering and treating molten metal adapted to implement a process for simultaneously filtering and treating a molten metal during an operation to cast said molten metal into a mold, said apparatus comprising a series of at least two refractory mineral material filtering plates in contact with each other at their periphery and defining between them at least one cavity, said filtering plates each having a series of filtering holes through which said molten metal flows and by which said molten metal is filtered, the dimensions of the filtering holes and the number of the filtering plates being selected so as to eliminate from the molten metal solid inclusions likely to affect the quality of the cast metal, said apparatus containing within said at least one cavity an inorganic treatment material for treating said molten metal flowing through the cavity, said treating material being in the form of one of solid compressed or molded or sintered treating plate positioned in said at least one cavity and extending over substantially the length and the width of said at least one cavity, said treating plate having when viewed in the direction of metal flow, a shape such that one or more passage holes are arranged in said treating plate for said molten metal to pass through said passage holes and through said apparatus.

2. Apparatus according to claim 1, wherein the weight of said treating material in said at least one cavity is between approximately 0,001% and 1% of the weight of said molten metal.

3. Apparatus according to claim 1, wherein the dimensions of said treating plate is less than or equal to the inside dimensions of said at least one cavity adapted to receive them.

4. Apparatus according to claim 1, wherein at least the side of said treating plate adjacent the bottom of said at least one cavity comprises a series of recesses.

5. Apparatus according to claim 4, wherein said recesses comprise a series of parallel dihedra.

6. Apparatus according to claim 4, wherein the other side of said treating plate also comprises recesses.

7. Apparatus according to claim 1, wherein said passage holes in said treating plate are larger than said filtering holes in said filtering plates.

8. Apparatus according to claim 1, wherein the side of said treating plate adjacent the bottom of said at least one cavity incorporates a recess defined by a peripheral rim which rests on the bottom of said at least one cavity.

9. Apparatus according to claim 1, wherein said treating material is chosen from the following substances: iron alloys, magnesium and magnesium compounds, calcium and calcium compounds, lithium compounds, strontium and barium compounds, silicon, zirconium, aluminum, rare earths, graphite and carbon.

10. Apparatus according to claim 1, wherein said treating material is in the form of a treating plate having passage holes the same shape as those of said filtering plates and is substituted for one of said filtering plates.

11. Apparatus according to claim 1, wherein said filtering plates define a plurality of cavities between them, and at least one of said cavities in said filtering plates is filled with a filter material.

12. Apparatus according to claim 11, wherein said filter material is disposed in a cavity on the downstream side of a cavity containing said treating material in the direction in which the molten metal flows through the apparatus.

13. Apparatus for filtering and inoculating molten metal adapted to implement a process for simultaneously filtering and inoculating a molten metal during an operation to cast said molten metal into a mold, said apparatus comprising a series of at least two refractory mineral material filtering plates in contact with each other at their periphery and defining between them at least one cavity, said filtering plates each having a series of filtering holes through which said molten metal flows and by which said molten metal is filtered, the dimensions of the filtering holes and the number of the filtering plates being selected so as to eliminate from the molten metal solid inclusions likely to affect the quality of the cast metal, said apparatus containing within said at least one cavity an inorganic inoculating material for inoculating said molten metal flowing through the cavity, said inoculating material being in the form of one of solid compressed or molded or sintered inoculating plate positioned in said at least one cavity and extending over substantially the length and the width of said at least one cavity, said inoculating plate having when viewed in the direction of metal flow, a shape such that one or more passage holes are arranged in said inoculating plate for said molten metal to pass through said passage holes and through said apparatus.

* * * * *